(12) United States Patent
Balaban et al.

(10) Patent No.: US 7,816,564 B2
(45) Date of Patent: Oct. 19, 2010

(54) MODIFIED CARBON NANOPARTICLES, METHOD FOR THE PRODUCTION THEREOF AND USE THEREOF

(75) Inventors: Teodor Silviu Balaban, Karlsruhe (DE); Mihaela Carmen Balaban, Karlsruhe (DE); Frank Hennrich, Karlsruhe (DE); Regina Fischer, Karlsruhe (DE); Sharali Malik, Karlsruhe (DE); Manfred Kappes, Ettlingen (DE)

(73) Assignee: Forschungzentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/991,245

(22) PCT Filed: Aug. 16, 2006

(86) PCT No.: PCT/EP2006/065368

§ 371 (c)(1),
(2), (4) Date: Aug. 31, 2009

(87) PCT Pub. No.: WO2007/025861

PCT Pub. Date: Mar. 8, 2007

(65) Prior Publication Data

US 2009/0326278 A1    Dec. 31, 2009

(30) Foreign Application Priority Data

Sep. 1, 2005    (DE) .................. 10 2005 041 378

(51) Int. Cl.
*C07C 45/00* (2006.01)
*B32B 9/00* (2006.01)
*D01F 9/12* (2006.01)

(52) U.S. Cl. .................. 568/397; 428/367; 423/447.1

(58) Field of Classification Search .................. 568/397; 428/367, 398; 423/447.1
See application file for complete search history.

(56) References Cited

U.S. PATENT DOCUMENTS

| 6,099,960 A * | 8/2000 | Tennent et al. ............... 428/367 |
| 6,331,262 B1 | 12/2001 | Haddon et al. |
| 6,645,455 B2 | 11/2003 | Margrave et al. |
| 2004/0180201 A1 | 9/2004 | Veedu et al. |
| 2004/0223900 A1 | 11/2004 | Khabashesku et al. |

FOREIGN PATENT DOCUMENTS

| EP | 1 061 042 | 12/2000 |
| WO | 03/078317 | 9/2003 |
| WO | 2004/052783 | 6/2004 |
| WO | 2005/070828 | 8/2005 |
| WO | 2005/113434 | 12/2005 |

OTHER PUBLICATIONS

Baek, J.B. et al: "Covalent Modification of Vapor-Grown . . . ", J. Mater, BD. 14, May 19, 2004, pp. 2052-2056, XP002422446.
Georgakilas V et al: "Purification of HIPCO Carbon . . . ", American Chemical Society, Wash. DC, BD. 124, No. 48, Dec. 4, 2002, pp. 14318-14319.
Lebedkin, et al: "Single-Wall Carbon Nanotubes With . . . ", Carbon 40, 2002, pp. 417-423.
Yakobsen, et al, Fullerene Nanotubes: $C_{1,000,000}$ and Beyond, American Scientist, vol. 85, Jul.-Aug. 1997, 324-337.

* cited by examiner

*Primary Examiner*—Sikarl A Witherspoon
(74) *Attorney, Agent, or Firm*—Lucas & Mercanti, LLP; Klaus P. Stoffel

(57) ABSTRACT

The present invention relates to novel carbon nanoparticles, especially to carbon nanoparticles which comprise or consist of carbon nanotubes and have been modified by means of acyl groups, to a novel process with which these modified carbon nanoparticles, especially carbon nanoparticles comprising or consisting of carbon nanotubes, are obtainable, and to the use of the modified carbon nanoparticles, especially carbon nanoparticles comprising or consisting of carbon nanotubes.

23 Claims, No Drawings

MODIFIED CARBON NANOPARTICLES, METHOD FOR THE PRODUCTION THEREOF AND USE THEREOF

This application claims the priority of DE 10 2005 041 378.1-44.

The present invention relates to modified carbon nanoparticles.

BACKGROUND OF THE INVENTION

Carbon nanoparticles are common knowledge. One form in which carbon nanoparticles may be present is that of carbon nanotubes.

One problem that these carbon nanoparticles or nanotubes have is their insolubility. Moreover, the production of carbon nanoparticles or nanotubes forms by-products (amorphous carbon, nm-size metal particles) which have to be removed when the intention is to use the nanoparticles or nanotubes, for example, in nanoelectronics.

Carbon nanotubes have very small cylindrical structures with a diameter of a few nanometers and a length ratio of from 10 to 1000. Carbon nanotubes have a honeycomb-like hexagonal structure in which each carbon atom is bonded to three adjacent carbon atoms. Depending on their exact structure, carbon nanotubes can act as conductors or as semiconductors. Carbon nanotubes may be present, for example, in the form of "single-wall carbon nanotubes", (SWNTs) and are then referred to in general terms as "buckytubes". For the sake of simplicity, these carbon nanotubes will also be referred to hereinafter as SWNTs. Owing to their unique properties, these SWNTs are the subject of intensive research studies. The properties of the SWNTs include strength/durability, stiffness, very high Young modulus, and thermal and electrical conductivity. SWNTs are similar to the fullerenes, which consist essentially of sp2-hybridized carbon atoms which are typically arranged in pentagons or hexagons (see, for example, B. I. Yakobsen and R. E. Smalley, American Scientist, Vol. 85, July-August, 1997, 324-337).

They can be prepared in relatively large amounts and in reproducible quality by controlled catalyzed growth initiated by metal nanoparticles.

"As-prepared" SWNTs, i.e. those which are yet to be processed after the preparation, tend to aggregate owing to the large surface pi systems and are therefore insoluble, difficult to free from the catalyst nanoparticles by purification, and generally not amenable to chemical reactions which require a homogeneous phase. The catalyst nanoparticles still present in the "as-prepared SWNTs" prevent, for example, use in nanocircuits. "As-prepared" SWNTs may still contain unshaped nanoparticles, i.e. those which are not of precisely defined shape, in an amount of up to 50% by weight of impurities (according to the catalyst). It would therefore be desirable to chemically derivatize carbon allotropes, particularly carbon nanoparticles, especially carbon nanoparticles comprising or consisting of carbon nanotubes, such that they are soluble in a common organic solvent.

It would thus be possible to free the "as-prepared" SWNTs of catalyst residues by purification. Carbon nanotubes may additionally also be present in the form of "multi-wall carbon nanotubes" (MWNTs). MWNTs are concentric SWNTs and have properties which are similar to those of the SWNTs but inferior. SWNTs have fewer defects compared to MWNTs and are accordingly stronger and more durable and have a higher conductivity.

Whether a particular carbon nanotube is metallically conductive, semiconductive or nonconductive is determined by factors including its chirality.

Subdivision is equally possible according to the diameter, SWNTs having diameters of from 0.7 to 3 nm and MWNTs a diameter of from 2 to 20 nm.

STATE OF THE ART

EP 1 061 042 A1 discloses a process for purifying carbon nanotubes, in which "crude", unmodified nanotubes are treated with an acidic gas by means of pyrolysis.

WO 03/078317 A1 discloses composites based on unmodified carbon nanotubes with polar polymers.

The article "Covalent modification of vapor-grown carbon nanofibers via direct Friedel-Crafts acylation in polyphosphoric acid" by Jong-Boem Baek et al. in J. Mater. Chem., 2004, 14, 2052-2056 discloses a process for polyphosphoric acid-catalyzed aroylation of carbon nanoparticles at 130° C. for 80 hours. As a result of the use of polyphosphoric acid as a catalyst and the extremely long reaction time, this process is, however, not of economic interest. In addition, the use of aromatic carboxylic acid derivatives does not lead to an increase in the solubility of the carbon nanoparticles in organic solvents.

OBJECT OF THE INVENTION

It is an object of the present invention to provide easy-to-handle carbon nanoparticles, especially carbon nanoparticles comprising or consisting of carbon nanotubes, and also a process for producing and/or purifying them.

It is a further object of the present invention to find a route to increase the solubility of carbon nanoparticles, especially carbon nanoparticles comprising or consisting of carbon nanotubes, in solvents, especially in organic solvents, or at least of increasing their dispersibility (i.e. the ability to be present in finely dispersed form as a discontinuous phase in a continuous phase or to be distributed therein).

It is likewise an object of the present invention to indicate a means by which carbon nanoparticles, especially carbon nanoparticles comprising or consisting of carbon nanotubes, can be purified in a simple and effective manner after their preparation.

DETAILED DESCRIPTION

In the context of the present invention, all quantitative data, unless specified otherwise, should be understood as weight data.

In the context of the present invention, the term "room temperature" means a temperature of 20° C.

Unless stated otherwise, the reactions and process steps detailed are performed at standard pressure (atmospheric pressure).

In the context of the present invention, the term "(meth)acryloyl" encompasses both acryloyl and methacryloyl. In the context of the present invention, the term "composites" means physical and/or chemical mixtures or compounds of polymers, copolymers or mixtures of polymers and/or copolymers with at least 10% by weight of one or more inorganic substances, where the inorganic substance(s) include(s) the acylated carbon nanoparticles of the present invention. Further inorganic substances which may be present as well as the acylated carbon nanoparticles are pigments, fillers and/or glass fibers of a wide variety of different lengths and diameters.

In the context of the present invention, "solubility" is understood to mean the amount of a substance which can just be dissolved in a particular amount of a particular solvent at a particular temperature. In the present invention, the solubility is reported in g/l, for a particular solvent and for a temperature of 20° C.

Accordingly, novel carbon nanoparticles, especially carbon nanoparticles comprising or consisting of carbon nanotubes, which have been modified by means of acyl groups have been found.

Additionally found has been a novel process with which these modified carbon nanoparticles, especially carbon nanoparticles comprising or consisting of carbon nanotubes, are obtainable.

Acylations on aromatic systems in organic chemistry are usually undertaken by the well-known Friedel-Crafts acylation.

In this reaction, aromatics are reacted with carbonyl chlorides by means of a catalyst present in (super)-stoichiometric amounts, normally aluminum chloride.

This reaction is performed with common aromatic compounds under mild conditions, i.e. at temperatures around room temperature.

However, owing to their general unreactivity caused by the extended pi system which leads to aggregation and hence to a poor solubility in the reaction mixtures, SWNTs usually do not react under the conditions of the Friedel-Crafts acylation even with the aid of various catalysts and with variation of the solvent.

In the context of the present invention, it has been found that, surprisingly, the acylation of SWNTs can nevertheless be undertaken by a reaction based on the Friedel-Crafts acylation.

In this case, the acylation is effected at temperatures between 130 and 250° C., preferably between 160 and 200° C., more preferably between 175 and 185° C., and over a period of between 1 and 6 hours, preferably between 2 and 4 hours.

Suitable solvents are carbon disulfide or nitro compounds such as nitromethane, nitrobenzene or nitrotoluene, and/or mixtures thereof. Preference is given to nitro compounds; especially preferred solvents in the context of the present invention are nitrobenzene or various ionic liquids. The ionic liquids have the advantage of a low vapor pressure and can be removed easily after the reaction.

In the context of the present invention, ionic liquids are understood to mean especially salt melts, for example of imidazolium salt, pyridinium salt or the like.

It has additionally been found that the Friedel-Crafts acylation of carbon nanoparticles, especially carbon nanoparticles comprising or consisting of carbon nanotubes, can be performed in the absence of solvents. To this end, in a preferred embodiment of the present invention, a melt of the Lewis catalyst employed, e.g. aluminum chloride, is used with a salt which forms a eutectic, e.g. sodium chloride, potassium chloride, lithium chloride, magnesium chloride, calcium chloride, preferably in anhydrous form, more preferably NaCl. The great advantage of working in the absence of solvents is the easy removal of the reaction products and an increased purity of the reaction products.

Useful acylating reagents are both carbonyl halides, and among these especially carbonyl chlorides, and also carboxylic anhydrides. It is also conceivable to use ketenes.

Usable carbonyl chlorides are monocarbonyl chlorides such as acetyl chloride, propionyl chloride, butyryl chloride, isobutyryl chloride, valeryl chloride, hexanoyl chloride, heptanoyl chloride, octanoyl chloride, decanoyl chloride, palmitinoyl chloride, lauroyl chloride, myristyl chloride, etc., and also acid chlorides of perfluorinated carboxylic acids or dicarbonyl mono- or dichlorides, such as oxalyl mono- or dichloride, succinyl mono- or dichloride, fumaryl mono- or dichloride, maleyl mono- or dichloride, adipyl mono- or dichloride, 1,10-decanoyl mono- or dichloride, 1,12-dodecanoyl mono- or dichloride, phthaloyl mono- or dichloride, isophthaloyl mono- or dichloride, terephthaloyl mono- or dichloride, etc., preference being given to the dichlorides over the monochlorides. In the context of the present invention, it is also possible to use higher-functionality carbonyl chlorides, especially hemimellitoyl mono-, di- or trichloride, trimellitoyl mono-, di- or trichloride, trimesoyl mono-, di- or trichloride, pyromellitoyl mono-, di-, tri- or tetrachloride, or naphthalenetetracarbonyl mono-, di-, tri- or tetrachloride.

Usable carboxylic anhydrides are acetic anhydride, propionic anhydride, butyric anhydride, isobutyric anhydride, maleic anhydride, succinic anhydride, phthalic anhydride.

Preference is given to using carbonyl chlorides and, among these, preference is given in turn to carbonyl chlorides of the general formula RCOCl where R represents $C_3H_7$ to $C_{15}H_{31}$ radicals. Examples thereof are palmitinoyl chloride, lauroyl chloride, butyryl chloride, hexanoyl chloride, heptanoyl chloride, octanoyl chloride, perfluorobutyryl chloride, 1,12-didodecanoyl chloride and/or mixtures thereof.

Especially preferred acylating reagents are palmitoyl chloride or lauroyl chloride.

The catalyst is used in stoichiometric or superstoichiometric amounts. Preference is given to using the catalyst in slightly superstoichiometric amounts. When acid anhydrides are used as acylating reagents, it must be ensured that the amounts of catalyst are increased to at least two equivalents.

The catalysts used in the context of the present invention may be both Lewis acids and protic acids.

Examples of usable Lewis acids are $AlCl_3$, $BF_3$, $SnCl_4$, $ZnCl_2$, $FeCl_3$, $SO_3$, $TiCl_4$, $SbF_5$, especially $AlCl_3$.

Examples of usable protic acids are $H_3PO_4$, $H_2SO_4$, $HClO_4$, especially $H_3PO_4$.

Particular preference is given to using aluminum chloride, especially anhydrous aluminum chloride, as the catalyst.

In the context of the present invention, the carbon nanoparticles to be modified may be SWNT and MWNT raw materials produced by the three processes of a) laser ablation, b) high-pressure CO (HiPCO) and c) chemical gas phase deposition (CVD).

In a preferred embodiment of the present invention, the use of polyphosphoric acid in the acylation reaction is ruled out. In another preferred embodiment of the present invention, the use of aromatic acylating reagents is ruled out. In a preferred embodiment of the present invention, the carbon nanoparticles to be modified are SWNT or "as-prepared" SWNT. It is a preferred variant when the carbon nanoparticles to be modified do not contain any MWNT.

In addition, it is possible in the context of the present invention to use alpha,omega-diacyl chlorides, which allows crosslinking of the carbon nanoparticles to be achieved. It is also possible in the context of the present invention to use perfluorinated acyl radicals.

It is equally possible to functionalize the carbonyl groups further by selected chemical transformations.

It is possible in the context of the present invention to use a mixture of different acylation reagents.

It is possible in the context of the present invention to crosslink the individual carbon nanoparticles, especially carbon nanoparticles comprising or consisting of carbon nanotubes, with one another by means of the acylation reagents, which allows particular chemical properties to be achieved.

The acylated carbon nanoparticles, especially carbon nanoparticles comprising or consisting of carbon nanotubes, compared to unmodified carbon nanoparticles, have a solubility in organic solvents which is several times better.

This improved solubility may be by several orders of magnitude. It is possible, depending on the length of the acyl chains and the type of the organic solvent, to dissolve up to amounts of from 2 to 5 g/l of the inventive modified nanoparticles.

Owing to the solubility thus achieved, it becomes possible to free "as-prepared" nanoparticles of the catalyst nanoparticles by purification to a purity of 99.9%, based on the total amount of carbon nanoparticles and catalyst nanoparticles, or more.

For example, after filtration, the solvent can be removed partly or completely in order thus to obtain recrystallized modified nanoparticles.

The acylated nanoparticles of the present invention may therefore thus also be used as part of a process for purifying nanoparticles. In such a process, the unpurified nanoparticles are first acylated by the process described. Thereafter, the acylated nanoparticles are separated from the impurities by extraction with a solvent or dispersant. Finally, the acyl groups are then detached from the nanoparticles, and highly pure nanoparticles, especially carbon nanoparticles comprising or consisting of carbon nanotubes, are obtained.

The purification can be effected by conventional purification methods, such as density gradient centrifugation, size exclusion chromatography, etc., especially density gradient centrifugation. As a result, the carbon nanoparticles, especially carbon nanoparticles comprising or consisting of carbon nanotubes, can be separated by size, length, diameter and/or chirality, especially by chirality. Subsequent defunctionalization, as appropriate by thermal or chemical processes, for example selective oxidative removal of the acyl chains or stepwise thermal decarboxylation, of the acylated carbon nanoparticles then allows the original carbon nanoparticles, especially carbon nanoparticles comprising or consisting of carbon nanotubes, to be obtained, which now, however, have a very high purity.

The modified carbon nanoparticles, especially carbon nanoparticles comprising or consisting of carbon nanotubes, no longer have a tendency to aggregate.

The modified carbon nanoparticles, especially carbon nanoparticles comprising or consisting of carbon nanotubes, even at room temperature, are very soluble in various organic solvents, such as tetrahydrofuran (THF), acetone, chloroform, dichloromethane, dimethyl sulfoxide, dimethylformamide (DMF), etc., and result in strongly colored, generally brown-red solutions which are stable in daylight even over several months and do not sediment any insoluble particles.

Most preferably, the modified carbon nanoparticles, especially carbon nanoparticles which comprise or consist of carbon nanotubes, are obtained by using nitrobenzene as the solvent and aluminum chloride as the catalyst, and performing the acylation at from 175 to 185° C. for from two to four hours.

It is a particularly preferred embodiment of the present invention to prepare a melt from an equimolar mixture of aluminum chloride and sodium chloride, in which the carbon nanoparticles and the acylation reagent are readily miscible and stirrable, and to perform the acylation therein at from 175 to 185° C. for from two to four hours.

The novel process is suitable for preparing modified carbon nanoparticles, especially carbon nanoparticles comprising or consisting of carbon nanotubes, both on the laboratory scale and on the metric tonne scale.

The novel process enables a rapid, inexpensive chemical derivatization of the carbon nanoparticles, especially carbon nanoparticles comprising or consisting of carbon nanotubes, with high yields.

By virtue of the wide variety of possible choices of the acyl radicals, the carbon nanoparticles, especially carbon nanoparticles comprising or consisting of carbon nanotubes, can be derivatized with various organic molecules.

The acylated nanoparticles of the present invention can be used for a wide variety of different purposes.

The acylated nanoparticles of the present invention can be used in composites composed of or comprising polymers or polymer mixtures, in which they improve the mechanical properties, such as strength, and durability of the composites and/or of the polymers or polymer mixtures and impart electrical and thermal conductivity to them or increase them.

To produce the composites, it is possible to use, for example, polycarbonates, (meth)acrylates, polyoxides, polyethers, polyesters, polysulfides, polysulfones, polyamides, polyurethanes, polyimides, polyvinyl acetates, polyvinyl alcohols, polyvinyl chlorides, polyvinylpyridines, polyvinylpyrrolidones, polyolefins, polyethylenes, polypropylenes, polyisobutylenes, polybutenes, polystyrenes, and any copolymers of the above.

The composites thus obtained may comprise customary additives such as fillers and pigments, especially conductive pigments, and mixtures thereof.

Examples of suitable effect pigments are metal flake pigments such as commercial aluminum bronzes and commercial stainless steel bronzes, and also nonmetallic effect pigments, for example pearlescent or interference pigments, platelet-shaped effect pigments based on iron oxide or liquid-crystalline effect pigments.

Examples of fluorescent pigments (daylight fluorescent pigments) are bis(azomethine) pigments.

Examples of suitable electrically conductive pigments are iron phosphide pigments.

Examples of magnetically screening pigments are pigments based on iron oxides or chromium dioxide.

Examples of suitable inorganic color pigments are white pigments such as titanium dioxide, zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, iron oxide red, cadmium sulfoselenide, molybdate red or ultramarine red; iron oxide brown, mixed brown, spinel phases and corundum phases or chromium orange; or iron oxide yellow, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

Examples of suitable corrosion-protection pigments are iron mica or zinc salts.

Examples of suitable metal powders are powders composed of metals and metal alloys, such as aluminum, zinc, copper, bronze or brass.

Examples of suitable organic and inorganic fillers are chalk, calcium sulfate, barium sulfate, silicates such as talc, mica or kaolin, silicas, oxides such as aluminum hydroxide or magnesium hydroxide, or organic fillers such as polymer powders, especially of polyamide or polyacrylonitrile.

Examples of suitable transparent fillers are those based on silicon dioxide, aluminum oxide or zirconium oxide. The composites may additionally comprise glass fibers. The modified nanoparticles may be used in field emission displays (FEDs), vacuum fluorescent displays (VFDs) or white light sources.

In addition, the modified nanoparticles may be used in tips for force field microscopy, for nanocircuits, for bulletproof fabric.

The various embodiments of the present invention, for example those of the different dependent claims, can be combined with one another in any desired manner.

The invention will now be illustrated with reference to the following nonlimiting examples.

EXAMPLES

Example 1

In a 100 ml three-neck flask with magnetic stirrer, dropping funnel and reflux condenser, which had been stored at 110° C. overnight, 20 ml of nitrobenzene were admixed with 1.6 g (0.012 mol) of aluminum chloride under a nitrogen atmosphere. With vigorous stirring and cooling with ice-water, 2.88 g (0.0105 mol) of palmitoyl chloride (C15H31COCl) in 10 ml of nitrobenzene were slowly added dropwise. Subsequently, at room temperature, a suspension of the nanotubes, which had been prepared by a pulsed laser evaporation of carbon tubes doped with cobalt and nickel, in 10 ml of nitrobenzene, which had been treated beforehand in an ultrasound bath for a few (four) minutes, was added. A preparation process is described in the literature by Lebedkin et al. (S. Lebedkin, P. Schweiß, B. Renker, S. Malik, F. Hennrich, M. Neumaier, C. Stoermer, M. M. Kappes, Carbon, 2002, 40, 417-423). The mixture was then heated and kept at 180° C. for 3 hours. In the course of this, the release of hydrogen chloride was observed (which can also be used for reaction monitoring). After three hours, the heating was stopped and the reaction vessel containing the black reaction mixture was stirred at room temperature overnight.

For decomposition (hydrolysis) of the resulting polyketone-aluminum chloride complex, the reaction mixture was poured cautiously onto about 50 g of ice treated with 1 ml of concentrated hydrochloric acid. A very viscous emulsion remained. Once the ice had melted, the mixture was filtered on a Büchner funnel with a suction bottle. The acylated nanotubes remained on the Büchner funnel as black, dense powder. They were then washed on the filter with NaHCO3 solution (1×15 ml) and then with water (1×20 ml). The organic phase (nitrobenzene) did not contain any nanotubes. The residues of water and nitrobenzene in the pulverulent nanotubes were removed by vacuum distillation at 1 mbar and approx. 100° C. The acylated nanotubes were subsequently heated on a sand bath at 0.2 mbar and 150° C., and the solvent residues were collected in a cold trap.

1.174 g of acylated nanotubes were obtained in the form of a black, free-flowing powder.

Examples 2 to 8

Example 1 was repeated, with the difference that the acid chlorides specified in table 1 were used. The yields achieved are likewise reported in table 1.

TABLE 1

| Example | Acid chloride | Yield |
|---|---|---|
| 2 | Lauroyl chloride (2.29 g, 2.5 ml) | 25.5 mg of SWNT afforded 1.1 g of crude product |
| 3 | Butyryl chloride (1.18 g, 1.08 ml) | 27.5 mg of SWNT afforded 0.35 g of crude product |
| 4 | Hexanoyl chloride (1.41 g, 1.44 ml) | 25.6 mg of SWNT afforded 0.93 g of crude product |
| 5 | Heptanoyl chloride (1.55 g, 1.61 ml) | 25 mg of SWNT afforded 1.08 g of crude product |
| 6 | Octanoyl chloride (1.71 g, 1.79 ml | 25 mg of SWNT afforded 0.70 g of crude product |
| 7 | Perfluorobutyryl chloride (2.44 g, 1.57 ml) | 23.8 g of SWNT afforded 0.85 g of crude product |
| 8 | Lauroyl chloride (2.28 g, 2.49 ml) and 1,12-didodecanoyl chloride (1.089 g, 0.245 ml) | 25 mg of SWNT afforded 1.35 g of crude product |

Example 9

Solvent-Free Reaction

An equimolar mixture of anhydrous aluminum chloride (1.6 g, 0.012 mol) and sodium chloride (0.702 g, 0.012 mol) was heated to 170° C. on a sand bath under a nitrogen atmosphere. At approx. 150° C., the mixture melted and was readily mixable with a magnetic stirrer. At 170° C., 25 mg of SWNT nanotubes were added under a nitrogen atmosphere. Lauroyl chloride (2.29 g, 2.5 ml, 0.0105 mol) was then added dropwise slowly and cautiously through a rubber septum by means of a syringe. A vigorous reaction commenced immediately and hydrogen chloride was released. The hydrogen chloride was detected by means of reaction with gaseous ammonia through formation of white ammonium chloride smoke. After the end of the addition, the mixture was stirred at 170° C. for 3 hours and then the reaction mixture was left to stand overnight under nitrogen without heating.

For workup, after cooling, the solid reaction mixture was induced to decompose on ice treated with 1 ml of concentrated aqueous HCl solution (approx. 30 g) with a spatula. Once the ice had melted, the modified nanotubes were filtered off on a Büchner filter with a suction bottle and washed on the filter repeatedly with saturated sodium hydrogencarbonate solution and then with distilled water. After drying under reduced pressure, a tacky mass of a brown to black color remained.

Example 10

Solvent-Free Reaction

Example 9 was repeated, except that a mixture of lauroyl chloride (2.29 g, 2.5 ml) and 1,12-didodecanoyl chloride (0.93 g, 0.858 ml) was added dropwise. The workup was effected as in example 9.

Highly pure nanotubes can be obtained by means of density gradient centrifugation. For this purpose, the crude products which have been obtained as described in examples 1 to 10 are applied to an aqueous sucrose (Merck) gradient suspended in tetrahydrofuran.

The sucrose gradient is typically generated with a gradient maker (model #GM-40) from C.B.S. Scientific Co., California. More preferably, mixtures of 10% and 40% (by weight)

aqueous sucrose are filled into the first and second vessel of the gradient maker respectively.

With vigorous stirring of the mixture which arises in the second vessel, a sucrose gradient is transferred directly into a centrifuge vessel by means of a peristaltic pump.

The centrifugation can be effected either at room temperature at 16 000 rpm for 30 min or, more preferably, at 4° C. overnight (12 hours) in an ultracentrifuge (Beckmann) at 50 000 rpm. In the course of this, pure black nanotubes will sediment at a lower temperature than the colored impurities.

The acylated nanotubes are readily soluble or dispersible in various organic solvents, such as THF or acetone (ultrasound bath), chloroform, dichloromethane, dimethyl sulfoxide, dimethylformamide.

The nanotubes coated with lauroyl radicals dissolve, for example, to an extent of 3.8 g/l in tetrahydrofuran, to an extent of 4.25 g/l in toluene or to an extent of 2.95 g/l in chloroform.

The invention claimed is:

1. Carbon nanoparticles modified with acyl groups, wherein they have been modified with acyl radicals selected from the group consisting of palmitinoyl, lauroyl, butyryl, hexanoyl, heptanoyl, octanoyl, perfluorobutyryl, 1,12-didodecanoyl and/or combinations thereof.

2. Modified carbon nanoparticles as claimed in claim 1, comprising carbon nanotubes.

3. Modified carbon nanoparticles as claimed in claim 1, wherein they have been modified with palmitinoyl or lauroyl.

4. Modified carbon nanoparticles as claimed in claim 1 having an improved solubility compared to the unmodified carbon nanoparticles.

5. Modified carbon nanoparticles as claimed in claim 1 having a purity of 99.9%, based on the total amount of carbon nanoparticles and catalyst nanoparticles.

6. Process for producing carbon nanoparticles modified with acyl groups, by reacting carbon nanoparticles, with carbonyl chlorides, carboxylic anhydrides and/or ketenes in the presence of a Lewis acid and/or of a protic acid, especially of a Lewis acid, in a solvent or a melt, wherein the carbonyl chlorides are selected from the group consisting of palmitinoyl chloride, lauroyl chloride, butyryl chloride, hexanoyl chloride, heptanoyl chloride, octanoyl chloride, perfluorobutyryl chloride, 1,12-idodecanoyl(di)chloride and mixtures thereof.

7. The process as claimed in claim 6, in which the reaction is effected at temperatures between 130 and 250° C.

8. The process as claimed in claim 6, in which the reaction is effected over a period of between 1 and 6 hours.

9. The process as claimed in claim 6, in which the solvent is selected from the group consisting of carbon disulfide, nitro compounds and mixtures thereof.

10. The process as claimed in claim 6, in which the solvent is selected from an ionic liquid.

11. The process as claimed in claim 6, in which the reaction is carried out in the absence of solvents in a salt melt.

12. The process as claimed in claim 6, wherein the Lewis acid is selected from the group consisting of $AlCl_3$, $BF_3$, $SnCl$, $ZnCl_2$, $FeCl_3$, $SO_3$, $TiCl_4$, $SbF_5$, especially $AlCl_3$.

13. The process as claimed in claim 6, wherein various mixtures of at least one monoacyl compound and at least one di- and/or polyacyl compound trimesoyl(tri)chloride, are used to produce nanoparticles crosslinked with them with different degrees of crosslinking.

14. A process comprising the steps of: providing nanoparticles; modifying the nanoparticles with acyl groups, with acyl radicals selected from the group consisting of palmitinoyl, lauroyl, butyryl, hexanoyl, heptanoyl, octanoyl, perfluorobutyryl, 1,12-didodecanoyl and/or combinations thereof; installing the modified nanoparticles in tips for force field microscopy, for nanocircuits, for bulletproof fabric, and also in composites composed of or comprising polymers or polymer mixtures for field emission displays (FEDs), vacuum fluorescence displays (VFDs) or white light sources.

15. A process for purifying nanoparticles by acylation, separation and subsequent deacylation, wherein the acylation includes modifying the nanoparticles with acyl radicals selected from the group consisting of palmitinoyl, lauroyl, butyryl, hexanoyl, heptanoyl, octanoyl, perfluorobutyryl, 1,12-didodecanoyl and/or combinations thereof.

16. The process as claimed in claim 15, wherein the separation is effected according to size, length, diameter and/or chirality.

17. The process as claimed in claim 6, wherein the carbon nanoparticles are carbon nanotubes, and including reacting the carbon nanotubes with carbonyl chlorides.

18. The process as claimed in claim 11, in which the reaction is carried out in the absence of solvents in a melt composed of an aluminum chloride/sodium chloride mixture.

19. The process as claimed in claim 13, wherein the monoacyl compound is lauroyl chloride and the di- and/or polyacyl compound is adipoyl(di)chloride.

20. The process as claimed in claim 7, in which the reaction is effected at temperatures between 160 and 200° C.

21. The process as claimed in claim 20, in which the reaction is effected at temperatures between 175 and 185° C.

22. The process as claimed in claim 8, in which the reaction is effected over a period of between 2 and 4 hours.

23. The process as claimed in claim 10, in which the solvent is imidazolium salt, pyridinium salt or mixtures thereof.

* * * * *